May 12, 1964 M. C. HARTNELL-BEAVIS 3,133,000
FUEL ELEMENTS FOR NUCLEAR REACTORS
Filed July 1, 1959 5 Sheets-Sheet 1

INVENTOR
MICHAEL CARL HARTNELL-BEAVIS
BY Kirschstein, Kirschstein & Ottinger
ATTORNEYS May 12, 1964     M. C. HARTNELL-BEAVIS     3,133,000
FUEL ELEMENTS FOR NUCLEAR REACTORS Filed July 1, 1959     5 Sheets-Sheet 2

INVENTOR
Michael Carl Hartnell-Beavis
BY
ATTORNEYS

May 12, 1964   M. C. HARTNELL-BEAVIS   3,133,000
FUEL ELEMENTS FOR NUCLEAR REACTORS
Filed July 1, 1959   5 Sheets-Sheet 4

INVENTOR
MICHAEL CARL HARTNELL-BEAVIS
BY Firschstein, Firschstein & Ottinger
ATTORNEYS United States Patent Office 3,133,000
Patented May 12, 1964

3,133,000
FUEL ELEMENTS FOR NUCLEAR REACTORS
Michael Carl Hartnell-Beavis, Longfield, Kent, England, assignor to The General Electric Company Limited, London, England
Filed July 1, 1959, Ser. No. 824,248
Claims priority, application Great Britain July 2, 1958
9 Claims. (Cl. 176—78)

This invention relates to fuel elements for nuclear reactors and more particularly to fuel elements for use in nuclear reactors of the kind in which fuel elements are received within channels through which fluid heat transfer medium is arranged to flow to extract heat from the elements during operation of the reactor. Thus the reactor may be of the heterogeneous type having a core of said moderating material, such as graphite, formed with fuel channels or alternatively it may be a reactor of the type using a liquid moderator in which the fuel channels are pressure tubes within the moderator.

With the development of fuels enriched in fissile isotopes it has been possible to avoid the use of fuels which suffer from appreciable deformation on passing through the uranium metal transition temperatures as they heat up, and to increase the fuel heat rating not only by permitting higher working temperatures, but also by increasing the surface area to mass ratio of the elements. This has been achieved in the past by forming the fuel elements as bundles of small diameter tubes or rods or as thin plates or the like; uranium oxide and uranium carbide are particularly advantageous fuels for this purpose, since in addition they possess good long term irradiation properties. It is however desirable to sheath these fuels, for reasons which are well-known, in an impermeable material, such as stainless steel, beryllium or the like, which has the requisite high temperature properties consistent with low neutron absorption characteristics and compatibility considerations.

These high surface area elements have been mounted longitudinally with respect to the fuel channels, the coolant flowing longitudinally over the elements. Moreover, in order adequately to support the elements, not only have end mountings to be provided but intermediate ones, too; with the result that additional parasitic neutron absorption and high pressure losses in the coolant flow are caused, notwithstanding higher costs involved in the difficult problem of manufacturing these complex supports.

It is an object of the present invention to obviate the use of such supports while at the same time providing a means for obtaining good heat transfer conditions with low pressure losses.

In accordance with the invention, a fuel element arrangement for a nuclear reactor of the kind specified comprises a carrier adapted for insertion in a said channel, said carrier being formed with or providing at least one duct adapted for flow therethrough of said fluid heat transfer medium, and a plurality of fuel members arranged across said or each said duct at intervals spaced in the direction of fluid flow through the duct or ducts. This carrier is preferably of moderating material, such as graphite.

The fuel members may be of any desired section, but are preferably of a section giving a low resistance to flow, such as streamline, oval, elliptical or lenticular section, all hereinafter generically referred to as "oval." They may alternatively be of circular plate or other convenient shape. They may conveniently be supported by their ends in said carrier and they may be assembled by means of spacers arranged to support the ends of said members.

The said carrier may be composed of at least two portions the joints between which lie substantially axially of the carrier. Then means for supporting fuel members within the carrier may comprise spigot means on said fuel members (or said carrier) and cooperating recesses in said carrier (or said fuel members).

In one preferred construction, the fuel members are arranged in a series of rows and it may be convenient and beneficial, then, to arrange that the members are at an inclination to a line parallel to the longitudinal axis of the duct in which they are supported. With the latter arrangement, alternate fuel members in some at least of said rows may be inclined at substantially equal but opposite directions to their neighbours. Certain benefits are discussed below and it would appear that greater benefit will accrue when the inclination is in the range of, say, 20° to 30° than when it is greater than 45°.

It will usually be necessary to include end spacers within each said fuel member to prevent overheating of the ends of the members, and such spacers may be formed of moderating material. Alternatively such spacers may be formed of refractory material, such as of magnesium oxide, having low neutron absorption characteristics; they may also be porous with the object of providing voidage for the accommodation and retention of fission product gases.

It may be desirable to provide means on said carrier to orientate said carrier, and therefore the fuel members, within a said channel of a reactor core and it may then be expedient to arrange cooperating means in said channel itself.

The fuel members may be arranged substantially in rows transverse to the longitudinal axis of the carrier and the fuel members in different rows may then be arranged substantially in line with each other in planes parallel to the longitudinal axis of the carrier.

In a preferred construction, the fuel members are so arranged that, in the general direction of fluid flow, one fuel member of one row is aligned with a space between fuel members of the next row.

In another construction, some of the rows of fuel members may be at an angle to other rows, and the rows may even be at right angles to each other.

Especially if the fuel members are of streamline section, the turbulent drag on the fluid medium passing through the duct will be kept to a minimum and in any event, losses of the prior arrangements above described, introduced by the end supports of the longitudinally disposed elements, are completely obviated since there need be no support in the flow path of the fluid medium.

Other advantages of a fuel element arrangement in accordance with the invention, even over the conventional plate-type elements are:

(a) It is possible to extrude or press ceramic or cermet fuel material with a desirable cross-section and to extrude or draw sheathing material of the required shape, so that there are no joints or welds along the length of the fuel members.

(b) The sheaths can have a continuous positive radius of curvature round a section, thus minimising distortion and separation of the sheath wall from the fuel material over a large area, such as might occur on the sides of a plate-type of element due to the local distortion of the fuel element material or collection of fission production gases.

It will be understood that a fuel element arrangement in accordance with the invention may be a composite structure consisting of fuel members placed across a duct in a carrier which may then be inserted as a unit into a said fuel channel in a moderating core.

In order that the invention may be better understood, fuel element arrangements will now be described by way of example with reference to the accompanying drawings.

One arrangement is illustrated in FIGURES 1 to 3, of which FIGURE 1 represents a plan view of the arrangement in position within a fuel channel of a reactor core of moderating material. FIGURE 2 shows a part-sectional representation on the line AA of FIGURE 1; and FIGURE 3 shows a part-sectional representation on the line BB in FIGURE 2.

Another arrangement is illustrated in FIGURES 4 to 7, of which FIGURE 4 shows an elevation in part section on the line CC of FIGURE 5, of this arrangement, FIGURE 5 shows an end view of the arrangement; FIGURE 6 shows a part-sectional elevation of one form of fuel member for this arrangement and FIGURE 7 a section on the line DD in FIGURE 6.

Figure 1:
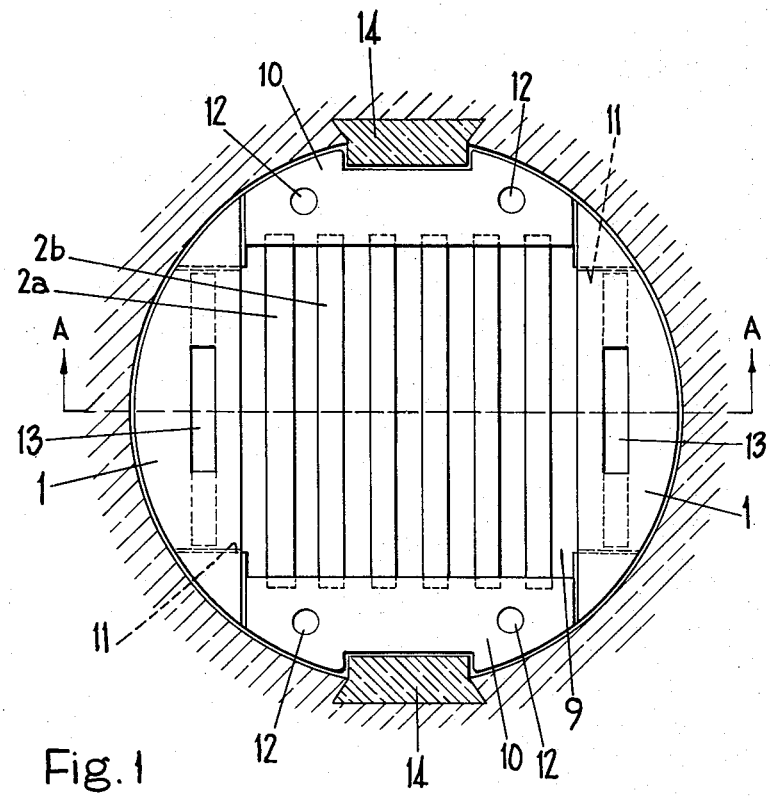
Figure 2:
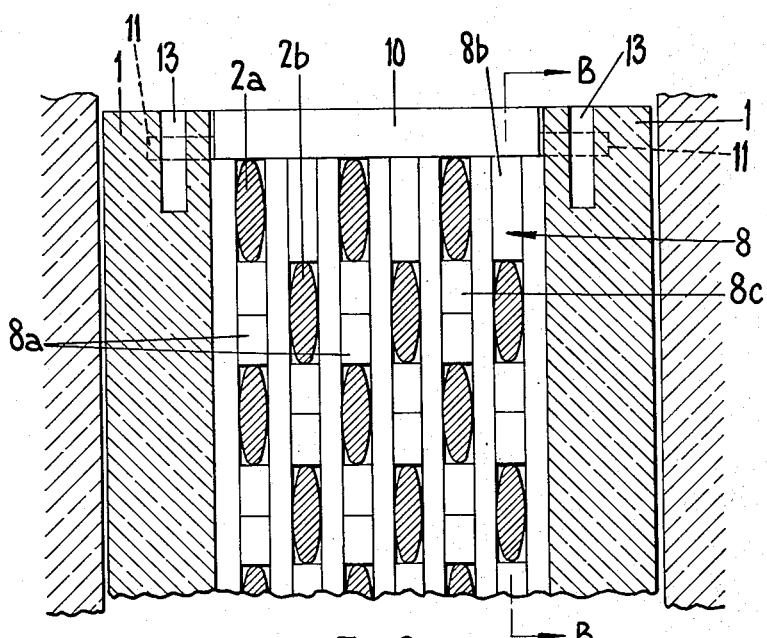
Figure 3:
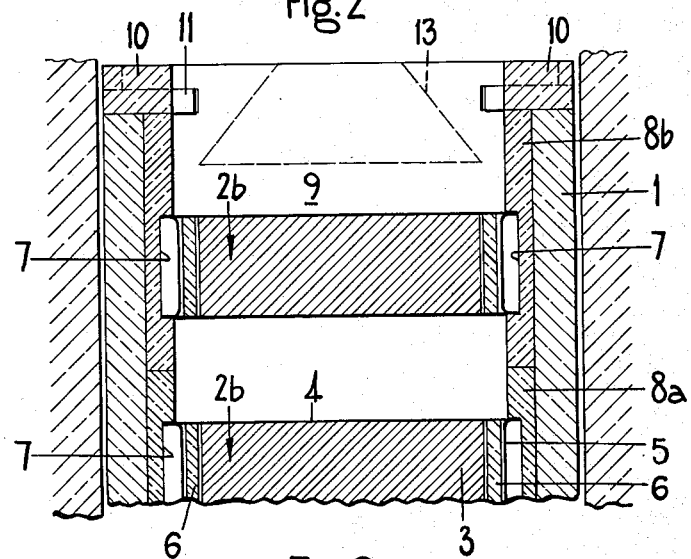

Whilst the arrangement shown in FIGURES 1 to 3 is intended for use in a reactor where the fuel channels are substantially vertical, and that of FIGURES 4 to 7 where they are substantially horizontal, it will be evident that little, if any, modification would be required to render the respective arrangements suitable for horizontal or vertical operation.

Referring now to FIGURES 1, 2 and 3, the arrangement comprises a number of rows of fuel members, in two groups of columns, the end members of rows of one such group being labelled 2a and those of the rows of the other group, 2b, the members of group 2a being arranged above spaces between the members of group 2b. The members are, as indicated, substantially elliptical in section with the major axis of the ellipse substantially in the direction of the fluid flow. They comprise a charge 3 of fuel (see FIG. 3) encased within a sheath 4 of any suitable material. The sheath has end caps 5 of similar material and graphite spacers 6 are included at each end to prevent overheating of the ends of the fuel members. Sheathing is completed in such a way that as much voidage as possible is left for the accumulation and retention of fission product gases.

The fuel members are supported at their ends in slots 7 formed in graphite spacers 8 which are assembled in sets of spaced grooves formed in oposite walls of an approximately square duct 9 in a carrier 1 of graphite or other suitable material. The standard spacer 8a is symmetrical, but at the top and bottom of each line of members, spacers spacers 8b or 8c are necessary to complete the columns, which are held in place by end pieces 10. These end pieces are keyed at either side into the slots 11 at the end of the carrier 1 and are retained by pegs 12. Although only one end of the arrangement is shown in the drawings, it is to be understood that similar constructions are used at the other end.

This fuel element arrangement can be charged and discharged as a composite assembly into the fuel channel of a reactor core, and for this purpose slots 13 are provided at both ends for engagement by the expanding tips of a fuel handling probe in known manner. The arrangement is shown in position in such a channel, in FIGURE 1; and it will be seen that the carrier is recessed at diametrically opposite regions for engagement by keys 14 which are provided in the fuel channels to orientate the arrangement.

In operation, the cooling fluid flows through the duct 9 lengthwise of the arrangement and it is seen that there is little resistance to the flow since, except for the fuel members themselves, there is no obstruction in the duct, and in addition the streamlined, i.e., oval, shape of the members prevent excessive turbulent drag in the wake of these members.

It will be appreciated that the above example may be considerably modified within the scope of the invention. Thus more elaborate shapes of fuel members may be used, as well as more simple, and it may be found convenient to provide a duct of cross-section other than the square one described. It is also envisaged that the carrier could be of skeleton formation.

Figure 4:
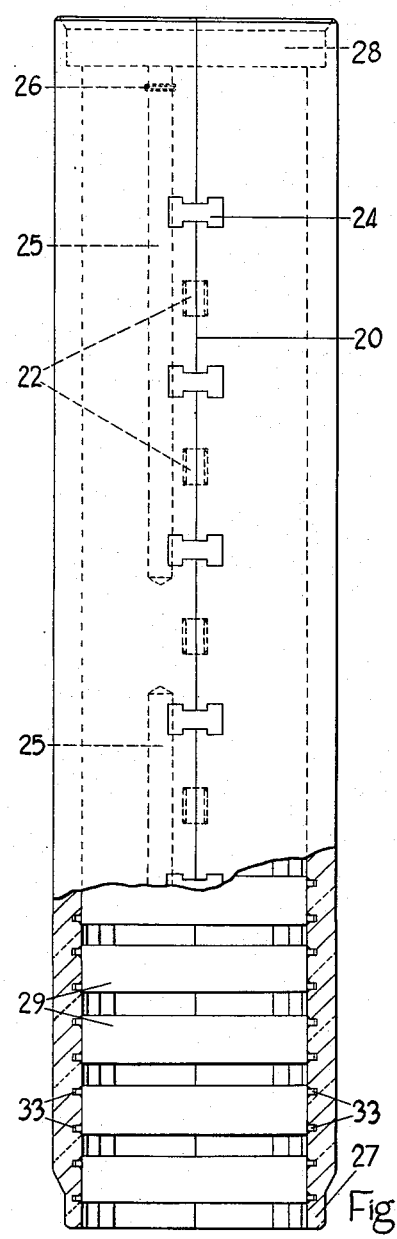
Figure 5:
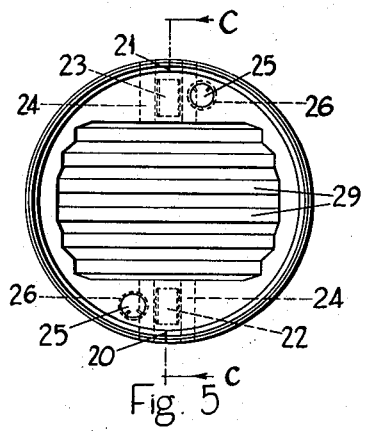

In the arrangement illustrated in FIGURES 4 to 7, the carrier, in the form of a graphite sleeve, is formed in two halves. The flow duct in this case is irregular in shape to allow of fuel members of three different lengths, as shown in FIGURE 5.

The joints between the halves of the sleeve are at 20 and 21, and graphite dowels 22, 23 are spaced along each joint to locate the halves relatively to each other. H-links 24 of graphite are arranged in suitable slots at spaced intervals along the lengths of the joints to keep the two halves together; these links are locked in position by longitudinal graphite pins 25 which, for convenience of length are inserted from either end along holes bored in the sleeve walls. These pins in turn are retained in position by steel clips which engage recesses 26 cut into the walls of these holes.

One end 27 of the sleeve is formed as a spigot which engages a locating bore, similar to that shown at 28, in an adjoining sleeve to maintain continuity of the fluid flow duct in successive sleeves when in a fuel channel. Locating arrangements (not visible) are provided to locate adjoining sleeves relatively to each other, so as to align the fuel members with respect to each other.

In this design the fuel members 29 are arranged in rows of six as indicated in FIGURE 5 and there are fifteen rows along the length of the sleeve.

Figure 6:
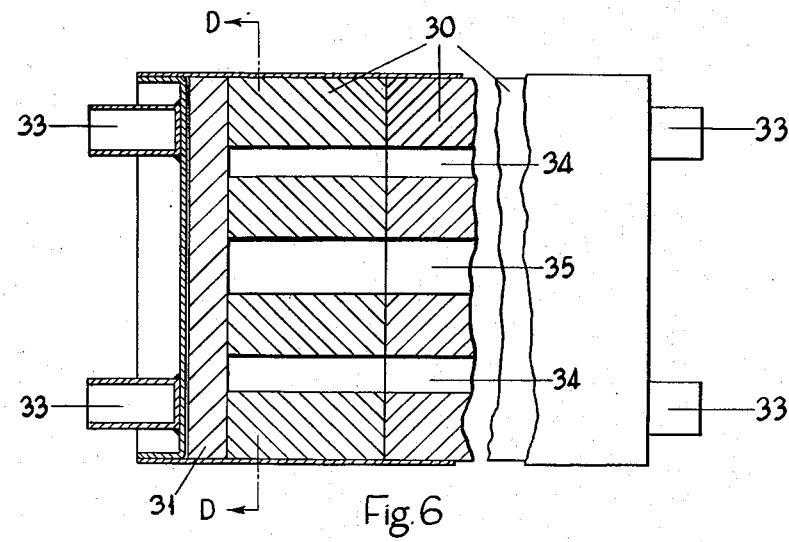
Figure 7:
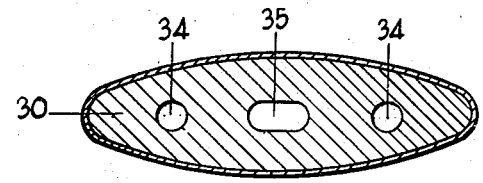

The fuel members are shown in greater detail in FIGURES 6 and 7. The stainless steel sheathing of each member is of elliptical (oval) section and the fuel proper is in the form of pellets 30, of which there are, say, eight per member, of uranium dioxide, which are formed to shape and assembled into the sheaths so that thermal contact may be attained between fuel and sheath. A magnesium oxide end spacer 31 is provided at each end of the member to protect the end caps 32 from the high temperatures of the fuel in operation. The end caps are welded to the sheathing and carry spigots 33, in the form of stampings, or they could be solid rods or could even be stamped integrally with the end caps. The function of these spigots is to retain the fuel members in position in the flow duct and for this purpose they engage holes in the wall of the graphite sleeve, as shown in FIGURE 4.

This particular arrangement is intended for high temperature operation, and, to provide for a slight reduction of the central temperature of the pellets, these are provided with holes 34 and 35 as indicated in FIGURES 6 and 7. The presence of these holes will also provide space for the collection of fission product gases.

Figure 8:
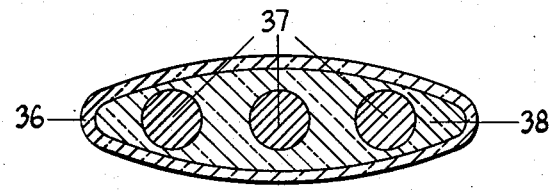
FIGURE 8 shows a sectional view of an alternative fuel member of which the sheathing is graphite.

There is no necessity for the sheathing of the fuel members to be metallic. In FIGURE 8, a fuel member is illustrated which is made with an impermeable graphite sheath 36. Types of impermeable graphite are now available which have very good mechanical properties and this material has a good performance at higher temperatures than at which other known sheathing materials can be used.

In order to obtain good thermal transfer, the fuel would be in the form of rods or pellets 37, loaded with a filling of a "spongy" graphite 38 into the outer sheath.

The complete assembly of fuel members in a graphite sleeve is preferably formed with means which can be engaged for charging and discharging it into or from a fuel channel in a reactor core and cooling fluid flowing into a said channel will then traverse the duct in the sleeve with the minimum of resistance from the fuel members, in virtue of their streamline form.

Figure 9:
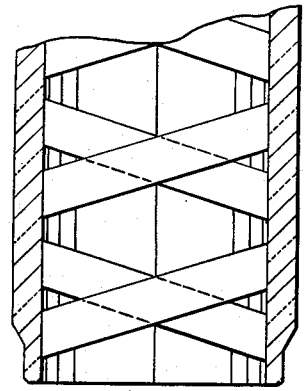
FIGURE 9 illustrates a construction of fuel element arrangement which is a modification of that shown in FIGURES 4 and 5.

A modification of this arrangement is illustrated in part in FIGURE 9 and will be clear when studied in conjunction with FIGURES 4 and 5. Here the rows of fuel members are arranged at an angle to the transverse axis of the sleeve. Alternate members in each row are inclined in opposite directions, so that three members in each row are inclined in each direction. In the illustration, alternate rows of fuel members have been omitted for clarity and it will be understood that, for the same loading, substantially the same number of fuel members will be required as for the arrangement of FIGURES 4 and 5.

The optimum angles of inclination will be a matter for experimentation in each particular case, depending upon loading, flow rates, fluid temperatures and so on. It may also be found necessary to apply the groove and spacer technique of the construction shown in FIGURES 1 to 3, instead of the spigot and hole arrangement, to position the inclined fuel members.

One advantage of the arrangement of FIGURE 9 is that, if the fuel members are close enough to each other, it has been found that the streaming of fluid along one member in operation is affected by the proximity of the other crossing member. The effect of this phenomenon is that any pulsating movement of the fluid, which tends to be set up as it flows past the fuel members, appears to be broken up; in this way it is probable that vibration which might otherwise tend to be set up in the fuel element, is prevented.

According to another feature of the invention the sheathing of fuel members arranged for cross flow of fluid is provided with fins or the like to enhance heat transfer characteristics of the fuel members.

Figure 10:
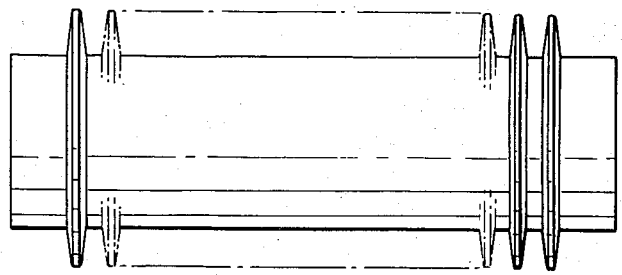
FIGURES 10 and 11 are representations in directions at right angles to each other, illustrating a more elaborate form of fuel member.
Figure 11:

One form of finned fuel member is illustrated in FIGURES 10 and 11. The fuel member comprises a charge of fuel such as has been described above. The sheathing is formed from a suitable material, possibly impermeable graphite, and the member and fins are shown as being of lenticular streamline section. The sheathing has a number of fins, as shown, which are in good thermal contact with its surface and possibly formed integrally therewith. The fins are preferably of similar material to that of the sheath, and may be spaced equally or the spacing may be graded along part or the whole of the length of the sheath. The fins need not essentially be of similar outline to the sheath in side view, as shown in FIGURE 11; nor need the fins be shaped in section as indicated in FIGURE 10, although this is desirable from the point of better heat transfer to the fluid flowing in the system, flow being arranged to be in the direction of the arrow in FIGURE 11.

With different fuels and cladding materials it may be more or less advantageous to provide fins. Thus, in general, with graphite cladding it will definitely be an advantage to provide them. It will be a matter for consideration, however, in the cases of beryllium and of so-called "Magnox" cladding materials; but with stainless steel, finning will not be a proposition, if only on account of its low thermal conductivity.

Figure 12:
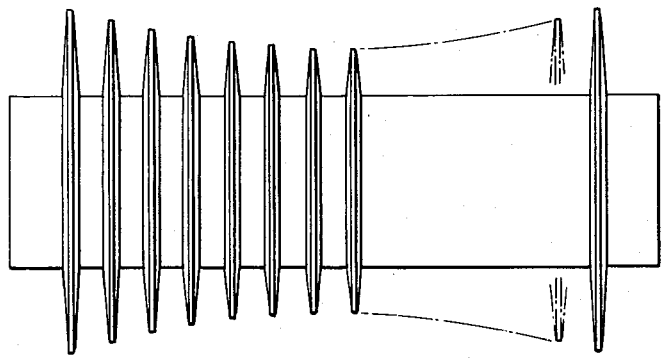
Figure 13:
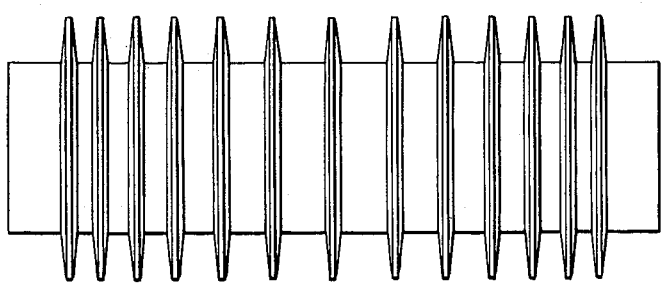

Since the temperature of the fuel in the fuel member will vary with distance from the wall of the channel in which the fuel element arrangement is positioned, it may be desirable to relate the characteristics of the fins on the fuel members to the positions of the fins along the length of the fuel member. Thus they may be arranged to be smaller nearer the middle of the fuel member than near the ends (FIG. 12), so as to ensure greater heat transfer from the ends which will tend to run hotter than the middle of the fuel member. Alternatively or additionally the spacing of the fins may be varied along the length of the fuel member (FIG. 13).

For similar reasons, it may be desirable to arrange that the fuel members themselves, irrespective of whether they are finned or not, are spaced at different intervals across the duct in which they are positioned.

It is known that increasing the pressure of coolant will provide a means of achieving a greater heat transfer on the output side of a gas-cooled reactor, and pressures of up to 60 atmospheres have in fact been proposed. The increase of pressure drop at these atmospheres does however lead to difficulty in supporting fuel elements of the known longitudinal flow type. The form of element arrangement in accordance with the invention is however ideally suited to the high pressure type of reactor and support may readily be made adequate, even at pressures of the order of 100 atmospheres.

According to another aspect of the invention, therefore, a high output gas-cooled reactor is adapted for operation at at least 80 atmospheres pressure of coolant.

Owing to the limitations of heat transfer in longitudinal flow over fuel elements of known type, gas-cooled graphite-moderated cores with outputs higher than, say 100 megawatts (thermal) require pressure vessels of such large size that they cannot be fabricated as a single unit under the strictly controlled conditions of a works since they cannot then be transported. It has been considered that they have to be welded "on site"; but this requires a severe limitation on thickness of wall of the pressure vessels and hence far less than those possible with shop-welded vessels. However an appreciable increase in performance can be obtained with cross flow element arrangements according to which the fuel heat rating can be raised above that which would be obtained by longitudinal flow at the same working temperature and the same coolant pressure drop along the channel. It is therefore made possible to use shop-welded vessels at outputs up to three or four times those hitherto possible using longitudinal flow type elements and hence over the whole range of output values likely to be useful in the future.

Although uranium oxide and uranium carbide are stated to be particularly advantageous fuels we do not wish it to be taken that element arrangements comprising fuels which are subject to the disadvantage that they pass through transition temperatures, if the temperature is allowed to attain such levels, are essentially excluded from the scope of the present invention. Even if the operating temperatures of the fuel elements are permitted to rise only to within a safe margin of the first transition temperature of uranium metal, so that uranium metal may in fact be used, a fuel arrangement in accordance with the invention permits of the design and operation of a reactor having far greater output than known heterogeneous reactors of like size. Other metallic fuel materials may be similarly used, in spite of a limitation on upper temperature of use, and yet give rise to possibilities of enhanced output. Especially by the provision of fins on fuel member sheaths referred to above, it is estimated that for the same coolant pumping power to thermal input ratio, the thermal output per channel can be increased over that for longitudinal flow about five times for a channel system less than half the length by the use of the cross-flow type of element arrangement in accordance with the invention.

I claim:

1. In a nuclear reactor having an elongated channel in which fuel members are arranged to be disposed and through which channel a fluid heat transfer medium is arranged to flow in a direction parallel to the longitudinal axis of the channel to extract heat from such members during operation of the reactor: a fuel arrangement comprising
   (a) an elongated carrier adapted to be inserted in said channel,
   (b) said carrier including means providing an internal duct within said carrier
      (i) which duct is defined by open ends and by sides forming a closed cross-section and
      (ii) which duct extends end-to-end in a direction parallel to the longitudinal axis of said channel for the flow through the duct of the fluid heat transfer medium in a direction parallel to the longitudinal axes of the channel and of the carrier, and (c) a plurality of elongated separate fuel members,
(i) said fuel members being located in said duct with their longitudinal axes extending transversely of the duct so that the direction of flow of the fluid heat transfer medium is transverse to the longitudinal axes of the fuel members,
(ii) the ends of said fuel members being supported on the sides of said ducts,
(iii) said fuel members having transverse cross-sectional dimensions which both are small in relation to the width and length of the duct and thereby provide space for the flow of the heat transfer medium in a direction generally parallel to the longitudinal axis of the duct,
(iv) said fuel members being mutually spaced apart and being located at intervals along the longitudinal axis of the duct,
(v) each of said fuel members being of oval transverse cross-section with the major dimension thereof extending in a direction parallel to the longitudinal axis of the duct.

2. A fuel arrangement as set forth in claim 1 wherein the carrier is composed of two sections, the joints between which extend in a direction parallel to the longitudinal axis of the carrier.

3. A fuel arrangement as set forth in claim 1 wherein the fuel members are arranged in a series of rows each row of which extends transversely across the duct, the series of rows extending relative to one another in a direction parallel to the longitudinal axis of the duct, said fuel members providing clear spaces therebetween extending in a direction parallel to the longitudinal axis of the duct.

4. A fuel arrangement as set forth in claim 1 wherein the longitudinal axes of at least some of the fuel members are inclined to the longitudinal axis of the duct.

5. A fuel arrangement as set forth in claim 4 wherein the fuel members are arranged in a series of rows each row of which extends transversely across the duct, the series of rows extending relative to one another in a direction parallel to the longitudinal axis of the duct and wherein alternate fuel members in at least some of the rows are inclined at substantially equal but opposite directions to adjacent fuel members.

6. A fuel arrangement as set forth in claim 1 wherein each of the fuel members includes a sheath and wherein at least some of the sheaths have fins lying in planes parallel to the longitudinal axis of the duct.

7. A fuel arrangement as set forth in claim 6 wherein the characteristics of the fins vary with respect to the positions of the fins along the longitudinal axis of a fuel member having the same.

8. A fuel arrangement as set forth in claim 7 wherein the fins are variably spaced along the longitudinal axis of the fuel member.

9. A fuel arrangement as set forth in claim 7 wherein the size of the fins vary according to the distance of the fins from the adjacent end of the fuel member.

References Cited in the file of this patent
UNITED STATES PATENTS

| | | |
|---|---|---|
| 2,856,340 | Wigner et al. | Oct. 14, 1958 |
| 2,861,033 | Treshow | Nov. 18, 1958 |
| 2,863,815 | Moore et al. | Dec. 9, 1958 |
| 2,865,826 | Stewart | Dec. 23, 1958 |
| 2,885,335 | Moore et al. | May 5, 1959 |
| 2,920,025 | Anderson | Jan. 5, 1960 |
| 2,987,458 | Breden et al. | June 6, 1961 |
| 3,037,924 | Creutz | June 5, 1962 |

FOREIGN PATENTS

| | | |
|---|---|---|
| 550,602 | Belgium | Sept. 15, 1956 |
| 216,817 | Australia | Sept. 1, 1958 |

OTHER REFERENCES

AEC Document NAA-SR-1936, September 1, 1957, in particular page 21.